Feb. 26, 1957 S. DEVICK 2,782,913
PAINT PRODUCTS AND CONTAINERS FOR THE SAME
Filed Aug. 31, 1953 2 Sheets-Sheet 1
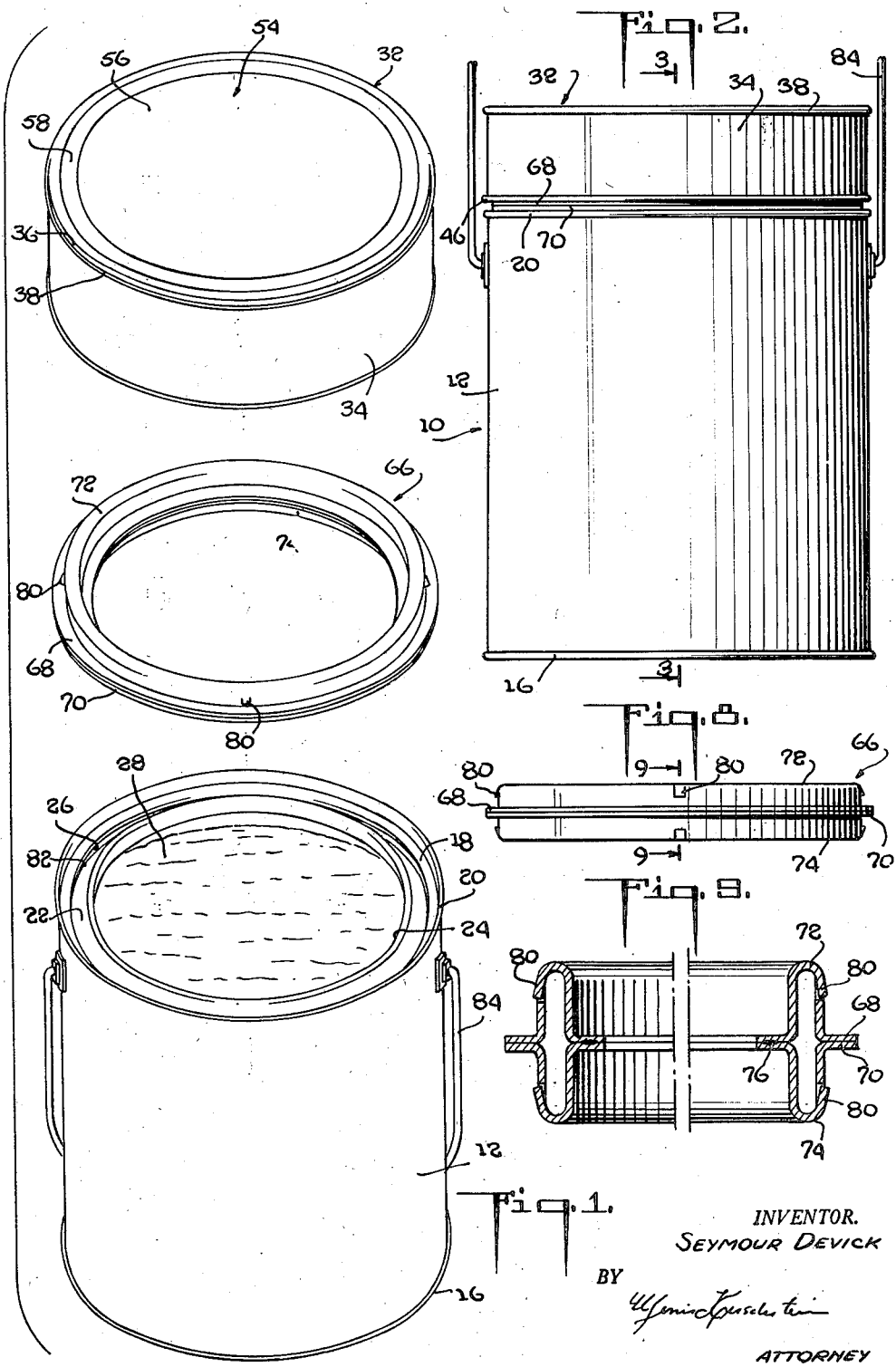
INVENTOR.
SEYMOUR DEVICK
BY
ATTORNEY Feb. 26, 1957 S. DEVICK 2,782,913
PAINT PRODUCTS AND CONTAINERS FOR THE SAME
Filed Aug. 31, 1953 2 Sheets-Sheet 2
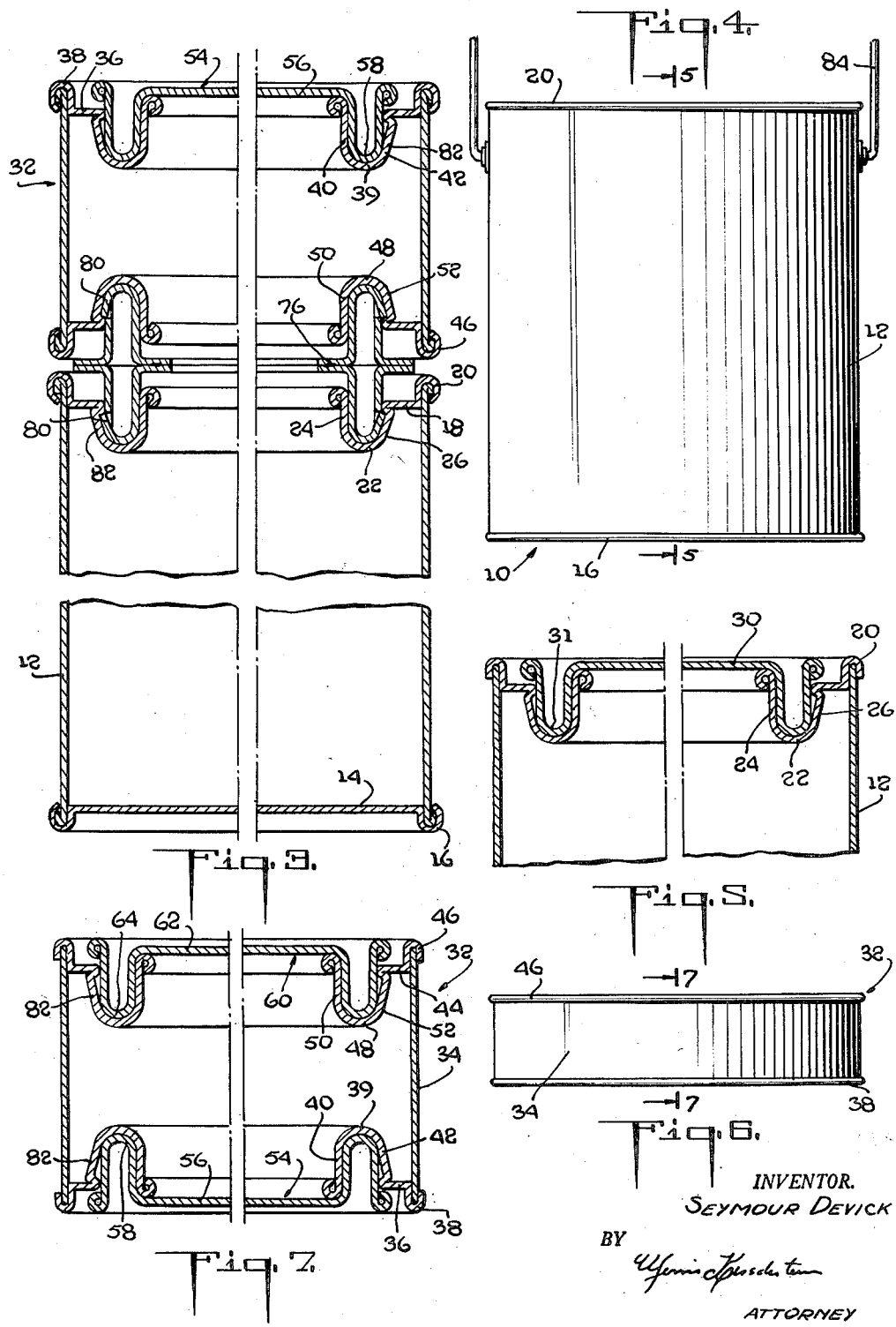
INVENTOR.
SEYMOUR DEVICK
BY
ATTORNEY United States Patent Office 2,782,913
Patented Feb. 26, 1957

2,782,913

PAINT PRODUCTS AND CONTAINERS FOR THE SAME

Seymour Devick, Teaneck, N. J.

Application August 31, 1953, Serial No. 377,649

8 Claims. (Cl. 206—47)

This invention relates to paint products and containers for the same.

Presently, in order to supply a customer with any one of a large number of colored paints without having to keep all these on the premises, it is the practice for a paint retailer to color paints when they are ordered. The retailer stocks pigments of the desired colors in collapsible tubes or small cans. When a customer requests some specific color, the paint dealer squeezes or scrapes out the entire contents of the proper tube or can of pigment into a can of white paint. The can of white paint and the pigment are put into a shaker and the contents agitated with the cover in place.

The difficulties of this procedure are several. For example, the color obtained is not uniform because the same amount of pigment is not invariably scraped or squeezed out of the container. The coloring operation is time-consuming and untidy for not only does paint sometimes spatter but, if the can of white paint already is full or almost full, as conventionally is the case, the addition of the pigment fills the can to overflowing. Either some paint is wasted or it is necessary to transfer a part of the paint to another container and to divide the pigment uniformly between both containers.

It is an object of this invention to provide paint and pigment containers which avoid the aforesaid difficulties.

More specifically it is an object of my invention to provide paint and pigment containers which are so constructed that exactly the proper amount of pigment can be transferred to the white paint, the pigment does not have to be removed manually from its container, and sufficient space always is provided for the pigmented paint even if the base white paint initially fills its container completely.

It is another object of my invention to provide paint and pigment containers of such construction that a proper mixture of pigment and paint can be secured even by unskilled labor that is relatively unfamiliar with proper methods of transferring and mixing pigments.

Another object of my invention is to provide paints and pigments in containers of the character described which will not appreciably add to the cost of the finished products, i. e. the colored paints.

Other objects of my invention in part will be obvious and in part will be pointed out hereinafter.

My invention accordingly consists in the features of construction, combinations of elements and arrangements of parts which will be exemplified in the devices hereinafter described and of which the scope of application will be indicated in the appended claims.

In the accompanying drawings, in which is shown one of the various possible embodiments of my invention, Fig. 1 is an exploded perspective view of the several elements which conjointly make up my invention, to wit, a can of base white paint, a can of pigment and a coupling ring;

Fig. 2 is a side view of the two cans as they appear when coupled;

Fig. 3 is a fragmentary vertical central sectional view through coupled cans shown in Fig. 2, the same being taken substantially along the line 3—3 of Fig. 2;

Fig. 4 is a side view of the can of paint prior to coupling;

Fig. 5 is a fragmentary sectional view taken substantially along the line 5—5 of Fig. 4;

Fig. 6 is a side view of the can of pigment prior to coupling;

Fig. 7 is a fragmentary sectional view taken substantially along the line 7—7 of Fig. 6;

Fig. 8 is a side view of the coupling ring; and

Fig. 9 is a fragmentary sectional view taken substantially along the line 9—9 of Fig. 6.

Referring now in detail to the drawings, the reference numeral 10 denotes an ordinary can of white paint. The can and its contents are entirely conventional. The paint is any standard white paint, it being understood that there are many different types, i. e., paints of different constitutions (rubber base, enamel, outside white, etc.), as is well known to the art.

Can 10 includes the usual cylindrical side wall 12 and base 14 joined by a bead seam 16. The top of the can constitutes an annular disc 18 joined to the top of the side wall by a bead seam 20. The inner edge of the disc is formed in the shape of one-half of a conventional friction joint such as is commonly employed in paint cans. More specifically, the inner edge of the said disc is fashioned to provide an annular, upwardly-facing groove 22, whose inner wall 24 is higher than its outer wall 26. The can is filled with a base white paint 28. As later will be appreciated, the can may be filled substantially to its top despite the fact that a pigment later will be added. The can is closed by a cover 30 of standard construction having an annular peripheral downwardly-extending rib 31, which snugly and tightly frictionally engages the side walls of the annular groove after the can has been filled.

As thus far described, it will be appreciated that the construction of the can 10 is entirely standard.

Pursuant to my invention, I provide a can 32 of pigment. Said can 32 is comparatively squat, its height being controlled by the amount of pigment intended to be contained therein. Said can 32 includes a cylindrical side wall 34. Both the top and the bottom of the can 32 are open and are provided with removable covers. More specifically, I provide a bottom annular disc 36 which is joined to the bottom of the side wall 34 by a bead joint 38. The inner edge of the disc 36 is formed with one-half of a conventional friction joint as, for example, a joint such as has been described above with respect to the top of the paint can 10, that is to say, the inner edge of the disc 36 is fashioned with a downwardly-facing annular groove 39, the inner side wall 40 of which is higher than the outer side wall 42. At the top of the can there is provided an upper annular disc 44 joined to the can by a bead seam 46 and provided at its inner edge with an upwardly-facing annular groove 48, the inner side 50 of which is higher than its outer side 52. A bottom cover 54 is included, the same constituting a disc 56 having a peripheral upwardly-facing annular rib 58, which snugly and tightly frictionally engages the bottom annular groove 39 and, in addition, the can 32 includes a top cover 60 constituting a disc 62 having a peripheral downwardly-facing annular rib 64 which snugly and tightly frictionally engages the upper annular groove 48. Can 32 contains a pigment (not shown). As is customary, the pigment is comparatively thick so that even if one of the covers 54, 60 should be removed and the can held with an open end thereof facing downwardly the pigment will not fall out of the can under its own weight unless disturbed.

Finally, and in further pursuance of my invention, I provide a coupling ring 66 which essentially constitutes upwardly and downwardly extending annular ribs designed to engage the annular groove 22 on the top of the can of white paint and either of the annular grooves 39, 48 of the can of pigment. In the embodiment of my invention herein illustrated, the coupling ring 66 constitutes an upper annular disc 68 and a lower annular disc 70. The upper disc is formed with a central upwardly-extending annular rib 72 and the lower disc is formed with a central downwardly extending annular rib 74. The two discs 68, 70 are permanently joined to one another as by welding 76 with the annular ribs in register.

Preferably the diameters of all the annular ribs and grooves, that is to say all the annular grooves 22, 39 and 48 and all the annular ribs 31, 58, 64, 72 and 74 are the same.

A retailer, stocking paints and pigments pursuant to my invention, will carry cans 10 of a base white paint, cans 32 of various colored pigments in a vehicle which is compatible with the base paint, and coupling rings 66. When a member of the public wishes to purchase a specific color of paint corresponding to a particular can of pigment, the retailer removes the cover 30 of a can of white paint and sets the coupling ring 66 into the groove 22 of said can, that is to say, he inserts one of the ribs 72, 74 into the groove, the remaining rib projecting above the can of white paint. The dealer also removes one of the covers 54, 60 of the can of pigment 32, e. g., the cover 60, and then turns the can of pigment upside down and brings it into a position in registry with the coupling ring which is on the can of white paint. The pigment will not fall out because of its semi-pasty character mentioned above. The upwardly-extending annular rib of the coupling ring is frictionally interfitted with the now downwardly-extending groove 48 of the can of pigment so that the can of white paint and the can of pigment now are combined through the medium of the coupling ring. The contents of the combined cans are accessible to one another through the large open center of the coupling ring. The combined cans are covered by the remaining cover 54 of the can of pigment. The combined cans are shaken up by any suitable means to disperse thoroughly the pigment through the white paint. The colored paint thereupon is ready for use and access thereto is secured through the cover 54.

It will be appreciated that the combined cans have a greater capacity than the can of white paint alone, the added capacity being substantially equal to the volume of pigment which has been mixed with the white paint.

Can 32 of pigment and the coupling ring 66 may be provided with interlocking means to prevent the combined cans from being separated once they have been interengaged. Such means desirably is of simple construction and automatically operable. The preferred means, which is illustrated in the drawings, constitutes a plurality of tangs 80 formed on the outer side walls of the annular ribs 72, 74. Said tangs have their bases integral with the ribs and their sides and tips struck free of the ribs. The tips of the tangs are displaced a short distance outwardly from the outer side walls of the ribs. The tangs in both ribs extend in a general direction towards the horizontal median plane of the coupling ring. The interlocking means further includes an annular indentation 82 formed in each of the annular grooves 22, 39 and 48, said indentation being located in the outer side walls 26, 42, 52 of each of the grooves immediately adjacent to the disc in which the groove is formed. The end of the indentation nearest the disc is blunt.

It will be seen that, when a rib 72 or 74 is inserted in one of the grooves, the tips of the tangs will be depressed during the introduction of the rib until the tip clears the blunt end of the groove, whereupon the tip will spring outwardly and prevent retrograde movement of the rib.

The can of paint is provided with a bail handle 84. Optionally, the can of pigment also may be provided with a similar handle.

While the invention has been described with reference to white paint as the base color, it readily will be understood that it applies with the same force and effort to any and all other base colors. Accordingly, the term "white paint" as used in the specification and claims hereof denotes any base paint regardless of color.

It thus will be seen that I have provided a device which achieves all the objects of my invention and are well adapted to meet the conditions of practical use.

As various possible embodiments might be made of the above invention, and as various changes might be made in the embodiment above set forth, it is to be understood that all matter herein described, or shown in the accompanying drawings, is to be interpreted as illustrative and not in a limiting sense.

Having thus described my invention, I claim as new and desire to secure by Letters Patent:

1. In combination, a can of white paint having an open end, a cover on said can of white paint, said open end of the can of white paint and said cover having mating halves of interengaging means; a can of pigment having two open ends with a clear space between said ends, a pair of covers on said can of pigment, said open ends of the can of pigment and said covers having mating halves of interengaging means; and a coupling ring having back-to-back halves of interengaging means similar to the halves of the interengaging means on the covers, whereby one cover is adapted to be removed from each can and the open ends of the cans coupled by the coupling ring to form a larger can in which the pigment can constitutes an extension of the can of white paint, the enlarged can having its own cover which consists of the cover left on the can of pigment.

2. In combination, a can of white paint having an open end, a cover on said can of white paint, said open end of the can of white paint and said cover having mating halves of interengaging means; a can of pigment having two open ends, a pair of covers on said can of pigment, said open ends of the can of pigment and said covers having mating halves of interengaging means; a coupling ring having back-to-back halves of interengaging means similar to the halves of the interengaging means on the covers; and means to lock the coupling ring to the cans when the halves of the interengaging means of the coupling ring are mated with the halves of the interengaging means of the cans, whereby one cover is adapted to be removed from each can and the open ends of the cans coupled by the coupling ring to form a larger can in which the pigment can constitutes an extension of the can of white paint, the enlarged can having its own cover which consists of the cover left on the can of pigment.

3. In combination, a can of white paint having an open end, means providing an annular groove around said open end, a cover on said can of white paint, said cover having an annular rib for matingly interengaging said groove; a can of pigment having two open ends, means providing an annular groove around each open end of the can of pigment, a pair of covers on said can of pigment, each of said covers having an annular rib for matingly interengaging an annular groove of said can of pigment; and a coupling ring having a pair of back-to-back annular ribs for matingly interengaging said annular grooves, whereby one cover is adapted to be removed from each can and the open ends of the cans coupled by the coupling ring to form a larger can in which the pigment can constitutes an extension of the can of white paint, the enlarged can having its own cover which consists of the cover left on the can of pigment.

4. In combination, a can of white paint having an open end, means providing an annular groove around said open end, a cover on said can of white paint, said cover having an annular rib for matingly interengaging said groove; a can of pigment having opposed open ends with a clear space between said ends, means providing an annular groove around each open end of the can of pigment, a pair of covers on said can of pigment, each of said covers having an annular rib for matingly interengaging an annular groove of said can of pigment; and a coupling ring having a pair of back-to-back annular ribs for matingly interengaging said annular grooves, whereby one cover is adapted to be removed from each can and the open ends of the cans coupled by the coupling ring to form a larger can in which the pigment can constitutes an extension of the can of white paint, the enlarged can having its own cover which consists of the cover left on the can of pigment.

5. In combination, a can of white paint having an open end, a coupling ring, means matingly interengaging the coupling ring and the can of white paint, a can of pigment having two open ends with a clear space between said ends, means matingly interengaging the coupling ring with one open end of the can of pigment, and a cover having means matingly interengaging the other open end of the can of pigment.

6. In combination, a can of white paint having an open end, means providing an annular groove around said open end, a coupling ring constituting a pair of back-to-back annular ribs, one of said ribs matingly interengaging said annular groove, a can of pigment having two open ends with a clear space between said ends, means providing an annular groove around each of said open ends, one of said annular grooves matingly interengaging the other of the annular ribs of the coupling ring, and a cover on said can of pigment, said cover having an annular rib matingly interengaging the other annular groove of the can of pigment.

7. For use with a can of white paint which has an open end closed by a cover that has one-half of an interengaging means mating with another half of the interengaging means carried by the can, and a can of pigment having two open ends which are closed by covers that have halves of interengaging means mating with halves of interengaging means carried by the can of pigment, there being a clear space between the open ends of the pigment can: a coupling ring having back-to-back halves of interengaging means similar to the halves of interengaging means on the covers.

8. For use with a can of white paint having an open end with an annular groove therearound and which end is closed by a cover having an annular rib matingly interengaging said groove, and a can of pigment having two open ends with annular grooves around said open ends, said ends being closed by covers having annular ribs matingly interengaging the annular grooves of said can of pigment, there being a clear space between the open ends of the pigment can: a coupling ring having back-to-back annular ribs similar to the annular ribs of the covers.

References Cited in the file of this patent
UNITED STATES PATENTS

| | | |
|---|---|---|
| 1,031,867 | Peebles | July 9, 1912 |
| 1,164,979 | Benko | Dec. 21, 1915 |
| 1,464,273 | Schopflocher | Aug. 7, 1923 |
| 1,757,192 | Hothersall | May 6, 1930 |
| 2,064,526 | Engel | Dec. 15, 1936 |
| 2,313,059 | Freeman | Mar. 9, 1943 |
| 2,562,496 | Kirsch | July 31, 1951 |